US012771919B2

(12) United States Patent
Du et al.

(10) Patent No.: US 12,771,919 B2
(45) Date of Patent: Oct. 20, 2026

(54) ELECTRONIC DEVICE AND CONTROL METHOD AND CONTROL APPARATUS THEREOF

(71) Applicant: VIVO MOBILE COMMUNICATION CO., LTD., Dongguan (CN)

(72) Inventors: Xianhe Du, Dongguan (CN); Wei Ye, Dongguan (CN); Mingjian Liu, Dongguan (CN); Fen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 535 days.

(21) Appl. No.: 18/221,526

(22) Filed: Jul. 13, 2023

(65) Prior Publication Data

US 2023/0353857 A1 Nov. 2, 2023

Related U.S. Application Data

(63) Continuation of application No. PCT/CN2022/070986, filed on Jan. 10, 2022.

(30) Foreign Application Priority Data

Jan. 14, 2021 (CN) ........................ 202110048806.8

(51) Int. Cl.
*H04N 23/57* (2023.01)
*H04M 1/02* (2006.01)
(Continued)

(52) U.S. Cl.
CPC .......... *H04N 23/57* (2023.01); *H04M 1/0268* (2013.01); *H04N 23/51* (2023.01);
(Continued)

(58) Field of Classification Search
CPC ........ H04N 23/57; H04N 23/51; H04N 23/55; H04N 23/60; H04M 1/0268;
(Continued)

(56) References Cited

U.S. PATENT DOCUMENTS 6,795,215 B1 9/2004 Silverbrook et al.
10,915,146 B2 * 2/2021 Zhao ........................ G06F 3/016
(Continued)

FOREIGN PATENT DOCUMENTS

CN 206060901 U 3/2017
CN 108024064 A 5/2018
(Continued)

*Primary Examiner* — Nhan T Tran
(74) *Attorney, Agent, or Firm* — The Webb Law Firm

(57) ABSTRACT

An electronic device includes a housing, a display screen, a deformation driving part and a camera module. The display screen includes a first region and a second region which are connected, a display surface of the first region is a first plane, a portion of the second region is a deformable region, the deformation driving part drives the deformable region to be switched between a flattening state and a bending state. When the deformable region is in the flattening state, a display surface of the deformable region is a second plane located within the same plane with the first plane. When the deformable region is in the bending state, the deformable region is a curved surface, a light transmitting region is arranged in the deformable region. When the deformable region is in the flattening state, ambient light passing through the light transmitting region is projected to the camera module.

20 Claims, 5 Drawing Sheets

(51) Int. Cl.

| | |
|---|---|
| ***H04N 23/51*** | (2023.01) |
| ***H04N 23/55*** | (2023.01) |
| ***H04N 23/60*** | (2023.01) |

(52) U.S. Cl.
CPC ............. *H04N 23/55* (2023.01); *H04N 23/60* (2023.01); *H04M 1/0264* (2013.01); *H04M 2250/52* (2013.01)

(58) Field of Classification Search
CPC ........... H04M 1/0264; H04M 2250/52; H04M 1/0269; G06F 1/1652; G06F 1/1686
See application file for complete search history.

(56) References Cited

U.S. PATENT DOCUMENTS

| | | | | |
|---|---|---|---|---|
| 12,055,978 | B2 * | 8/2024 | Du | G06F 1/1686 |
| 2019/0373151 | A1 | 12/2019 | Jia | |
| 2021/0329112 | A1 | 10/2021 | Li | |
| 2021/0385365 | A1 * | 12/2021 | Ma | H04N 9/3141 |
| 2022/0253106 | A1 * | 8/2022 | Du | H04M 1/0266 |
| 2022/0261041 | A1 | 8/2022 | Du et al. | |
| 2022/0261043 | A1 | 8/2022 | Du et al. | |

FOREIGN PATENT DOCUMENTS

| | | | |
|---|---|---|---|
| CN | 108270951 | A | 7/2018 |
| CN | 208607557 | U | 3/2019 |
| CN | 109756594 | A | 5/2019 |
| CN | 110879671 | A | 3/2020 |
| CN | 110928364 | A | 3/2020 |
| CN | 110928365 | A | 3/2020 |
| CN | 111277685 | A | 6/2020 |
| CN | 111739414 | A | 10/2020 |
| CN | 111966234 | A | 11/2020 |
| CN | 112291457 | A | 1/2021 |
| CN | 112714209 | A | 4/2021 |
| CN | 112887534 | A | 6/2021 |
| JP | S58190003 | A | 11/1983 |

* cited by examiner

ELECTRONIC DEVICE AND CONTROL METHOD AND CONTROL APPARATUS THEREOF

CROSS-REFERENCE TO RELATED APPLICATIONS

This application is a Bypass Continuation application of International Application No. PCT/CN2022/070986 filed Jan. 10, 2022, and claims priority to Chinese Patent Application No. 202110048806.8 filed Jan. 14, 2021, the disclosures of which are hereby incorporated by reference in their entireties.

BACKGROUND OF THE INVENTION

Field of the Invention

This application relates to the technical field of communication devices, and more particularly relates to an electronic device and a control method and a control apparatus thereof.

Description of Related Art

With the development of electronic devices, the electronic devices with a high screen-to-body ratio are increasingly popular with consumers. Increasing the screen-to-body ratio of the electronic devices has become a new development trend.

In order to retrain a front-facing camera while the screen-to-body ratio of the electronic device is increased, there are several designs, such as a notch screen, a hole-punch screen, a pop-up front-facing camera and an under-display camera on the market at present. But, images are not displayed in screen parts, which are notch or punch-hole, of the front-facing cameras designed in the manner of the notch screen and the hole-punch screen, which influences the display effect of the electronic devices to a certain degree. The pop-up front-facing camera guarantees a display area of the screen, but the time duration from camera pop-up to image acquiring is long. The design of the under-display camera solves the problems about the electronic device display area and the image feedback time, but the screen where the camera is located requires high light transmittance, which will make the number of display components at the camera reduced, and then influence the display effect.

SUMMARY OF THE INVENTION

In a first aspect, an embodiment of this application discloses an electronic device, including a housing, a display screen, a deformation driving part and a camera module, where the display screen is disposed on the housing, a device inner cavity is formed by the display screen and the housing, the camera module and the deformation driving part are both disposed in the device inner cavity, the display screen includes a first region and a second region which are connected, a display surface of the first region is a first plane, the second region is located on an edge of the display screen, a portion of the second region is a deformable region, the deformation driving part is connected to the deformable region, and drives, through deformation, the deformable region to be switched between a flattening state and a bending state, and when the deformable region is in the flattening state, a display surface of the deformable region is a second plane, and the second plane and the first plane are located within the same plane; and when the deformable region is in the bending state, the deformable region is a curved surface, a light transmitting region is arranged in the deformable region, and when the deformable region is in the flattening state, ambient light passing through the light transmitting region is projected to the camera module.

In a second aspect, an embodiment of this application discloses a control method of an electronic device. The electronic device is the electronic device according to the first aspect. The control method includes: receiving an input; controlling, when the input is a first input, the deformation driving part to drive the deformable region to be in the flattening state and controlling the camera module to shoot; and controlling, when the input is a second input, the deformation driving part to drive the deformable region to be in the bending state.

In a third aspect, an embodiment of this application discloses a control apparatus of an electronic device. The electronic device is the electronic device according to the first aspect. The control apparatus includes: a receiving module, configured to receive an input; a first control module, configured to control, when the input is a first input, the deformation driving part to drive the deformable region to be in the flattening state and control the camera module to shoot; and a second control module, configured to control, when the input is a second input, the deformation driving part to drive the deformable region to be in the bending state.

In a fourth aspect, an embodiment of this application discloses an electronic device, including a processor, a memory, and a program or an instruction stored in the memory and executable on the processor, and when the program or instruction is executed by the processor, the steps of the control method according to the second aspect are implemented.

In a fifth aspect, an embodiment of this application discloses a non-transitory readable storage medium, storing a program or an instruction, and when the program or instruction is executed by a processor, the steps of the control method according to the second aspect are implemented.

In a sixth aspect, an embodiment of this application discloses a computer program product, stored in a non-volatile storage medium. The program product is configured to be executed by at least one processor to implement the steps of the control method according to the second aspect.

In a seventh aspect, an embodiment of this application discloses a chip, including a processor and a communication interface. The communication interface is coupled to the processor, and the processor is configured to run a program or instruction to implement the control method according to the second aspect.

DESCRIPTIONS OF REFERENCE NUMERALS

Figure 1:
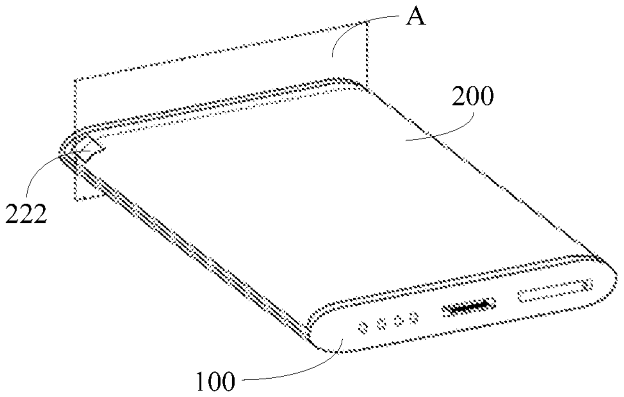
FIG. 1 is a schematic diagram of an electronic device in a bending state of a deformable region according to an embodiment of this application.
Figure 2:
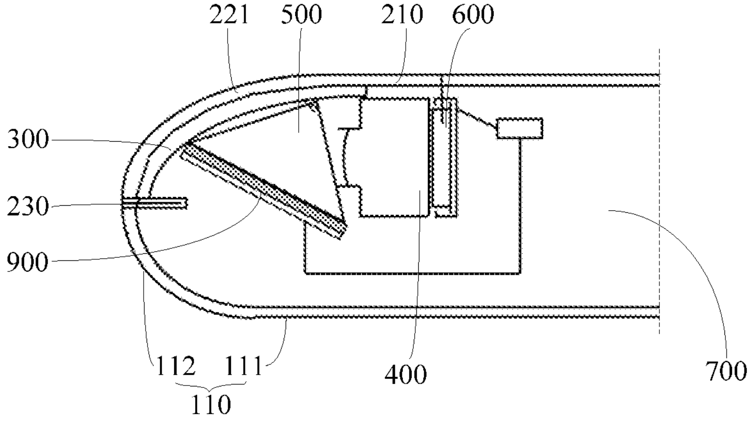
FIG. 2 is a section view of a part of structure cut out along a section A in FIG. 1.
Figure 3:
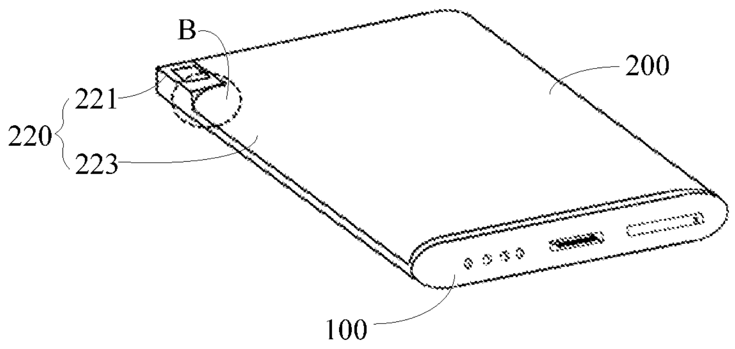
FIG. 3 is a schematic diagram of an electronic device in a flattening state of a deformable region according to an embodiment of this application.
Figure 4:
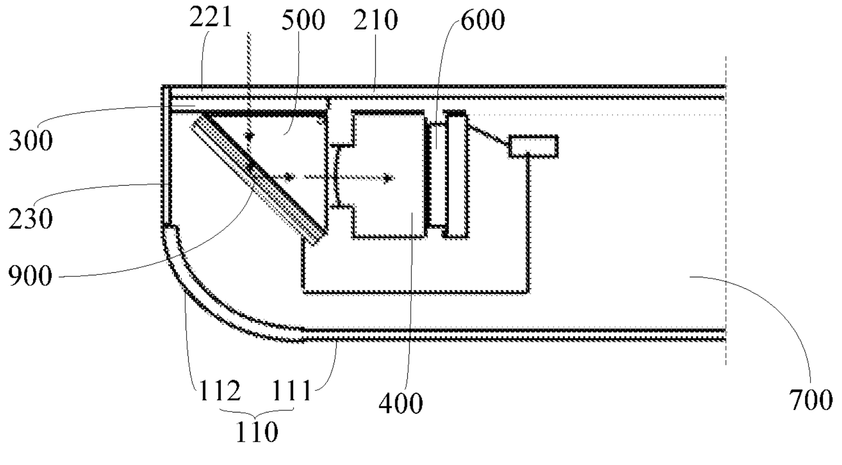
FIG. 4 is a section view of a part of structure in FIG. 3, single arrows indicate a light path in FIG. 4.
Figure 5:
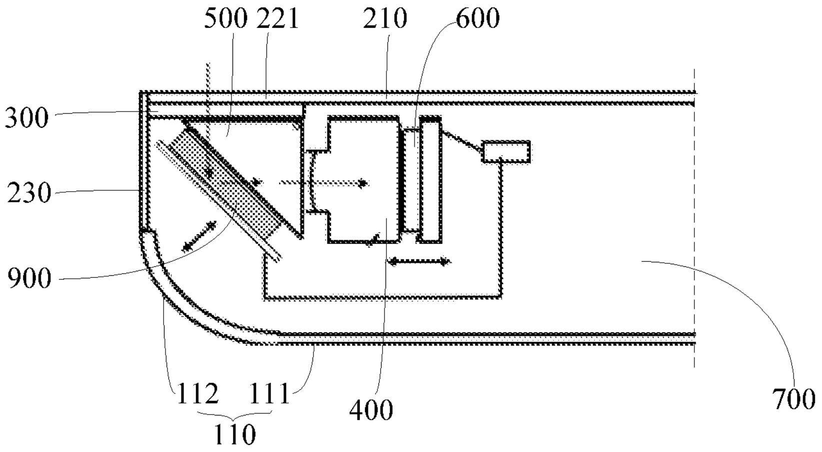
FIG. 5 is a schematic diagram of projection of ambient light when a T-lens structural member is thickened according to an embodiment of this application, in which single arrows indicate a light path, and double arrows indicate a T-lens thickness change direction or a motion direction of a camera module in FIG. 5.
Figure 6:
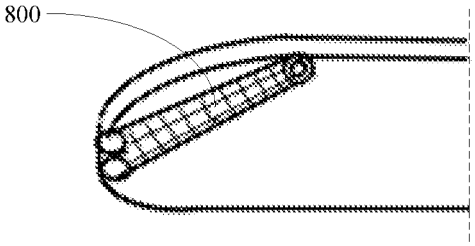
FIG. 6 is a section view of a part B in FIG. 3 in a second shrinking state of a second elastic connection mechanism.
Figure 7:
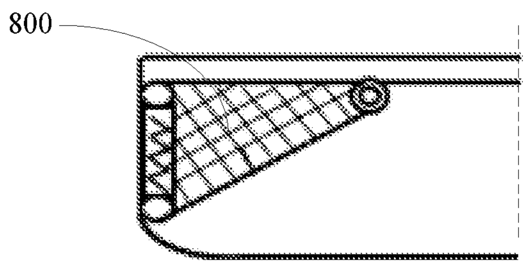
FIG. 7 is a section view of the part B in FIG. 3 in a second stretching state of the second elastic connection mechanism.

100—housing, 110—rear cover, 111—plane portion, and 112—bending portion;
200—display screen, 210—first region, 220—second region, 230—first folding mechanism, 221—deformable region, 222—light transmitting region, and 223—rigid region;
300—deformation driving part;
400—camera module;
500—first reflective member;
600—driving mechanism;
700—device inner cavity;
800—second elastic connection mechanism;
900—second reflective member; and
1200—electronic device, 1201—radio frequency unit, 1202—network module, 1203—audio output unit, 1204—input unit, 12041—graphics processing unit, 12042—microphone, 1205—sensor, 1206—display unit, 12061—display panel, 1207—user input unit, 12071—touch panel, 12072—another input device, 1208—interface unit, 1209—memory, 1210—processor, and 1211—power supply.

DESCRIPTION OF THE INVENTION

To clearly state the objectives, technical solutions, and advantages of this application, the technical solutions of this application will be clearly described below with reference to specific embodiments of this application and the accompanying drawings. Apparently, the described embodiments are only some embodiments rather than all the embodiments of this application. All other embodiments obtained by an ordinary person skilled in the art based on the embodiments of this application shall fall within the scope of protection of this application.

The technical solutions disclosed by the embodiments of this application are described in detail by combining drawings below.

As shown in FIGS. 1 to 7, an embodiment of this application discloses an electronic device. The disclosed electronic device includes a housing 100, a display screen 200, a deformation driving part 300 and a camera module 400.

The housing 100 serves as a basic component of the electronic device, the housing 100 may provide an installation basis for some other components of the electronic device. The display screen 200 is disposed on the housing 100, a device inner cavity 700 is formed by the display screen 200 and the housing 100, the device inner cavity 700 is an installation space and can accommodate some other components of the electronic device, and the camera module 400 and the deformation driving part 300 are both disposed in the device inner cavity 700. In addition, the device inner cavity 700 may also protect some other components (e.g., a mainboard and a battery) of the electronic device.

The display screen 200 includes a first region 210 and a second region 220 which are connected, and a display surface of the first region 210 is a first plane, that is, an outer surface of the first region 210 is a plane. The second region 220 is located on an edge of the display screen 200, a portion of the second region 220 is a deformable region 221, and the deformable region 221 may be of a flexible screen structure.

The deformation driving part 300 is connected to the deformable region 221, and the deformation driving part 300 drives, through deformation, the deformable region 221 to be switched between a flattening state and a bending state. When the electronic device is in a shooting mode, the deformation driving part 300 drives, through deformation, the deformable region 221 to be in the flattening state. When the electronic device is in a daily work mode (i.e., a non-shooting mode), the deformation driving part 300 drives, through deformation, the deformable region 221 to be in the bending state, and in the case, the display screen 200 becomes a curved screen, such as a waterfall screen. In an optional solution, the first region 210 and the second region 220 may be of an integrated structure. Of course, the first region 210 and the second region 220 may be of a split type structure, and may be assembled and connected in a bonding manner.

When the deformable region 221 is in the flattening state, the display surface of the deformable region 221 is a second plane, that is, an outer surface of the deformable region 221 is a plane, and the second plane and the first plane are located within the same plane. When the deformable region 221 is in the flattening state, the second plane and the first plane can realize display at the same time. When the deformable region 221 is in the bending state, the deformable region 221 is a curved surface. When the deformable region 221 is in the bending state, display is realized mainly through the first plane. A light transmitting region 222 is arranged in the deformable region 221, and when the deformable region 221 is in the flattening state, the ambient light passing through the light transmitting region 222 is projected to the camera module 400. When the camera module 400 works and the deformable region 221 is in the flattening state, the ambient light passes through the light transmitting region 222 and is projected to the camera module 400.

In a specific working process, when the electronic device is in the shooting mode, the deformable region 221 is driven by the deformation driving part 300 to be gradually switched into the flattening state from the bending state, the ambient light passes through the light transmitting region 222 and is projected to the camera module 400, and the camera module 400 starts to work. When the electronic device is in the daily work mode (i.e., the non-shooting mode), the deformable region 221 is driven by the deformation driving part 300 to be gradually switched into the bending state from the flattening state, and the camera module 400 does not work.

According to the electronic device disclosed by the embodiment of this application, the structure of the electronic device in the background is improved, such that the display screen 200 includes the first region 210 and the second region 220 which are connected, and the portion of the second region 220 is the deformable region 221. The deformation driving part 300 is connected to the deformable region 221, such that when the electronic device is in the shooting mode, the deformable region 221 can be driven by the deformation driving part 300 to be gradually switched into the flattening state from the bending state, then, the ambient light passes through the light transmitting region 222 and is projected to the camera module 400, and the camera module 400 starts to work. The camera module 400 finishes working, and when the electronic device is in the daily work mode (i.e., the non-shooting mode), the deformable region 221 is driven by the deformation driving part 300 to be gradually recovered to the bending state from the flattening state. The structure can prevent a front surface (i.e., the first region 210), towards a user, of the display screen 200 from being provided with the light transmitting region 222, such that an effective display area of the electronic device can be increased. It is apparent that due to the electronic device disclosed by the embodiment of this application, the display area of the electronic device can be effectively increased, and the display effect of the electronic device is improved.

As mentioned above, when the deformable region 221 is in the flattening state, the ambient light passes through the light transmitting region 222 and is projected to the camera module 400, the camera module 400 may be arranged towards the light transmitting region 222, and in this case, the ambient light passing through the light transmitting region 222 can be directly projected to the camera module 400, thereby realizing shooting via the camera module 400.

In another optional solution, orientation of the light transmitting region 222 may intersect with orientation of the camera module 400. A first reflective member 500 is disposed between the light transmitting region 222 and the camera module 400, and the ambient light passing through the light transmitting region 222 is reflected to the camera module 400 through the first reflective member 500. When the electronic device is in the shooting mode, the ambient light is first projected from the outside to the first reflective member 500 through the light transmitting region 222, and then, reflected to the camera module 400 through the first reflective member 500. In this case, by changing a set position of the camera module 400, the camera module 400 can be prevented from being arranged in a region covered with the deformable region 221, thereby facilitating bending deformation of the deformable region 221. Meanwhile, the first reflective member 500 can adjust a light path direction, the camera module 400 may be transversely arranged in the device inner cavity 700, such that a thickness of the electronic device can be effectively reduced, and the electronic device is lighter and thinner.

It is to be noted that transverse arrangement of the camera module 400 means that the orientation of the camera module 400 is perpendicular to the orientation of the first region 210, and the thickness direction of the electronic device refers to a size of the electronic device in a direction perpendicular to the first region 210.

In the embodiment of this application, the first reflective member 500 may be disposed in the device inner cavity 700 in a preset manner, such that light transmitted in the flattening state of the deformable region 221 can be right reflected by the first reflective member 500 at a preset position into the camera module 400. For example, the first reflective member 500 may be fixed into the device inner cavity 700 in a fixed manner, such as bonding and fixing through glue.

In another optional solution, the first reflective member 500 may be connected to the deformation driving part 300, the deformation driving part 300 drives the first reflective member 500 to move to a working position, and the ambient light passing through the light transmitting region 222 is reflected by the first reflective member 500 at the working position to the camera module 400. In this case, the deformation driving part 300 may also realize adjustment on the position of the first reflective member 500 while driving the deformable region 221 to deform. It is apparent that the position of the first reflective member 500 can be adjusted according to deformation of the deformation driving part 300. Of course, when the deformation driving part 300 drives the deformable region 221 to bend, the first reflective member 500 is more easily arranged in a narrow environment on an inner side of the bent deformable region 221. Due to the manner, the narrow space in the device inner cavity 700 can be sufficiently utilized for arrangement, thereby achieving the purpose of sufficient space utilization and facilitating the structure of the electronic device to be more compact.

At the same time, because the deformation driving part 300 may also drive the first reflective member 500 to move, it is unnecessary to arrange a driving device special for the first reflective member 500, thereby effectively reducing the usage quantity of components of the electronic device, making the electronic device lighter and cost lower.

Optionally, the first reflective member 500 may be rotationally disposed on the inner side of the deformable region 221. The electronic device may further include a driving mechanism 600, and the driving mechanism 600 is disposed on the side of the camera module 400 facing away from the first reflective member 500, and the driving mechanism 600 drives the camera module 400 to push the first reflective member 500 to rotate, such that a light incident surface of the first reflective member 500 is closely attached to the inner side of the deformable region 221 in the flattening state. When the electronic device is in the shooting mode, the driving mechanism 600 can drive the camera module 400 to push the first reflective member 500 to rotate, such that the light incident surface of the first reflective member 500 is closely attached to the inner side of the deformable region 221 in the flattening state to play a certain supporting role on the flattened deformable region 221 and make the deformable region 221 flatter, thereby preventing bad influences of low flatness of the deformable region 221 on shooting, meanwhile, well correcting an incident direction of the ambient light, and achieving the purpose of optical image stabilization. The driving mechanism 600 may be a hydraulic telescopic member, an air pressure telescopic member, a piezoelectric structural member, a shape memory alloy structural member, etc., and the embodiment of this application does not limit a specific kind of the driving mechanism 600.

In another implementation, the first reflective member 500 is rotationally disposed on the inner side of the deformable region 221. The electronic device may further include a driving apparatus, and the driving apparatus is connected to the first reflective member 500 and drives the first reflective member 500 to rotate, such that the light incident surface of the first reflective member 500 faces the deformable region 221 in the flattening state. The structure specially arranges the driving apparatus for the first reflective member 500, such that independent control over the first reflective member 500 is facilitated, and meanwhile influences from other components can be avoided. In a similar way, the driving apparatus may be a driving motor, a hydraulic motor, etc., and the embodiment of this application does not limit a specific kind of the driving apparatus.

In the embodiment of this application, the first reflective member 500 may be a plane mirror, and may also be a reflective mechanism of another special-shaped structure (e.g., a triangular prism mentioned later), as long as the ambient light passing through the deformable region 221 in the flattening state is reflected to the camera module 400. The embodiment of this application does not limit a specific kind of the first reflective member 500.

In an optional solution, the first reflective member 500 may be the triangular prism, and a right-angled portion of the triangular prism is rotationally connected to the deformable region 221 or the deformation driving part 300, such that the deformation driving part 300 can adjust the position of the triangular prism. In the flattening state, a first right-angle surface of the triangular prism is arranged towards the deformable region 221, a second right-angle surface of the triangular prism is arranged towards the camera module 400, and the structure of the triangular prism better facilitates supporting of the deformable region 221, thereby making the deformable region 221 in the flattening state flatter.

Optionally, the first region 210 has an inner surface facing away from the first plane, the inner surface is parallel to the first plane, and the camera module 400 is disposed on the inner surface in a sliding manner. The inner surface of the first region 210 is a plane so as to guide movement of the camera module 400, thereby better facilitating accurate movement of the camera module 400.

In the embodiment of this application, a second reflective member 900 may be attached to a bevel edge of the first reflective member 500, and the second reflective member 900 may be of a tunable lens (T-lens) structural member, a middle layer of the T-lens structural member is made of electro-deformed material, and in the power-on state, a thickness of the electro-deformed material may change, and as a result, a thickness of the T-lens structural member may change as well. The ambient light passing through the light transmitting region 222 may be reflected into the camera module 400 sequentially through the first reflective member 500 and the second reflective member 900, and the second reflective member 900, in the power-on state, adjusts an angel of the ambient light through thickness adjustment. When the second reflective member 900 is in the power-on state, the thickness of the T-lens structural member may change, such that the angle of the ambient light projected into the camera module 400 through the first reflective member 500 and the second reflective member 900 changes, thereby achieving the purpose of optical image stabilization.

As mentioned above, the display screen 200 is disposed on the housing 100, and in the process of switchover of the deformable region 221 between the flattening state and the bending state, the deformable region 221 may move relative to the housing 100, such that a part where the deformable region 221 is connected to the housing 100 has a gap, which will bring problems about dustproof and waterproof. On that basis, in an optional solution, the electronic device may further include a first folding mechanism 230, the first folding mechanism 230 forms a sealing connection between the deformable region 221 and the housing 100, and when the deformable region 221 is in the flattening state, the first folding mechanism 230 is in an unfolding state; and when the deformable region 221 is in the bending state, the first folding mechanism 230 is in a folding state. The first folding mechanism 230 can plug the gap generated between the deformable region 221 and the housing 100 in the process of switching the deformable region into the flattening state from the bending state. Meanwhile, the first folding mechanism 230 forms a sealing connection between the deformable region 221 and the housing 100, and thus, when the deformable region 221 is in the flattening state, the first folding mechanism 230 may play a certain dustproof and waterproof role, and meanwhile appearance performance of the electronic device can be improved. At the same time, the first folding mechanism 230 may be made of a material (e.g., rubber) with good anti-fatigue performance, so as not to be prone to damage under long-term and multi-time switchover between the folding state and the unfolding state.

In another optional solution, the electronic device may further include a first elastic connection mechanism. The first elastic connection mechanism may be made of a telescopic material, such as silica gel and rubber. The first elastic connection mechanism forms a sealing connection between the deformable region 221 and the housing 100. When the deformable region 221 is in the flattening state, the first elastic connection mechanism is in a first stretching state, and when the deformable region 221 is in the bending state, the first elastic connection mechanism is in a first shrinking state. The first elastic connection mechanism can plug the gap generated when the deformable region 221 is changed into the flattening state from the bending state, meanwhile, the first elastic connection mechanism forms a sealing connection between the deformable region 221 and the housing 100, and thus, when the deformable region 221 is in the flattening state, the first elastic connection mechanism may further play a certain waterproof and dustproof role on the electronic device. At the same time, the first elastic connection mechanism realizes deformation through its own length, and cannot occupy a large space.

In the embodiment of this application, the second region 220 may further include a rigid region 223. The rigid region 223 and the deformable region 221 may be in a sealing connection through a second elastic connection mechanism 800. The second elastic connection mechanism 800 is similarly made of a telescopic material. When the deformable region 221 is in the flattening state, the second elastic connection mechanism 800 is in a second stretching state and seals a gap between the deformable region 221 and the rigid region 223, and meanwhile the second elastic connection mechanism 800 may further play a certain waterproof and dustproof role on the electronic device. When the deformable region 221 is in the bending state, the second elastic connection mechanism 800 is in a second shrinking state and is folded between the deformable region 221 and the rigid region 223. The second elastic connection mechanism 800 may be a silicon sheet, elastic cloth, etc.

In the embodiment of this application, the housing 100 may include a rear cover 110. The rear cover 110 may include a plane portion 111 and a bending portion 112, and the bending portion 112 is connected to the plane portion 111, such that a curve of the rear cover 110 of the electronic device is smoother and more attractive. When the deformable region 221 is in the bending state, the bending portion 112 is in linkage with the second region 220, and tangent lines at a joint of the bending portion 112 and the second region 220 are collinear. When the deformable region 221 is in the bending state, the bending portion 112 and the second region 220 of the rear cover 110 are in linkage with the same radian in the same plane, such that a side edge of the whole electronic device is smoother so as to be conveniently grabbed by a user during usage, thereby effectively improving the grabbing hand feeling of the user.

For example, the first region 210 and the second region 220 may be both display regions, and light transmittance of the deformable region 221 may be greater than that of the first region 210. Both the first region 210 and the second region 220 can realize a display function, but the light transmittance of the deformable region 221 of the second region 220 is high, and thus the ambient light may be projected to the camera module 400 through the light transmitting region 222 of the deformable region 221, thereby further facilitating shooting during displaying.

Based on the electronic device disclosed by the embodiment of this application, an embodiment of this application discloses a control method of an electronic device. The control method is applicable to the above electronic device, and the disclosed control method includes the following steps.

Step 101: Receiving an input.

In the step, the input may be a voice input, a key input, etc. of a user.

Step 102: Controlling, when the input is a first input, a deformation driving part 300 to drive a deformable region 221 to be in a flattening state and control a camera module 400 to shoot.

In the step, an instruction that the first input is a shooting mode may be set, and when the input is the first input, the deformation driving part 300 drives the deformable region 221 to be gradually in the flattening state from a bending state, and ambient light is projected to the camera module 400 through a light transmitting region 222 of the deformable region 221, thereby realizing a shooting function.

Step 103: Controlling, when the input is a second input, the deformation driving part 300 to drive the deformable region 221 to be in the bending state.

In the step, an instruction that the second input is a daily work mode (i.e., a non-shooting mode) may be set, and when the input is the second input, the deformation driving part 300 drives the deformable region 221 to be gradually recovered to the bending state from the flattening state.

Based on the electronic device disclosed by the embodiment of this application, an embodiment of this application discloses a control apparatus of an electronic device. The control apparatus is applicable to the above electronic device, and the disclosed control apparatus includes:

- a receiving module, configured to receive an input;
- a first control module, configured to control, when the input is a first input, a deformation driving part 300 to drive a deformable region 221 to be in a flattening state and control a camera module 400 to shoot, where in a specific working process, the first control module controls the deformation driving part 300 to work, the deformation driving part 300 drives the deformable region 221 to be gradually in the flattening state from a bending state, and ambient light is projected to the camera module 400 through a light transmitting region 222 of the deformable region 221, thereby realizing a shooting function; and
- a second control module, configured to control, when the input is a second input, the deformation driving part 300 to drive the deformable region 221 to be in the bending state, where in a specific working process, the second control module controls the deformation driving part 300 to work, and the deformation driving part 300 drives the deformable region 221 to be gradually recovered to the bending state from the flattening state.

The electronic device disclosed by the embodiment of this application may be a mobile phone, a tablet computer, an e-book reader, a game player, a wearable device, etc., and the embodiment of this application does not limit a specific kind of the electronic device.

Figure 8:
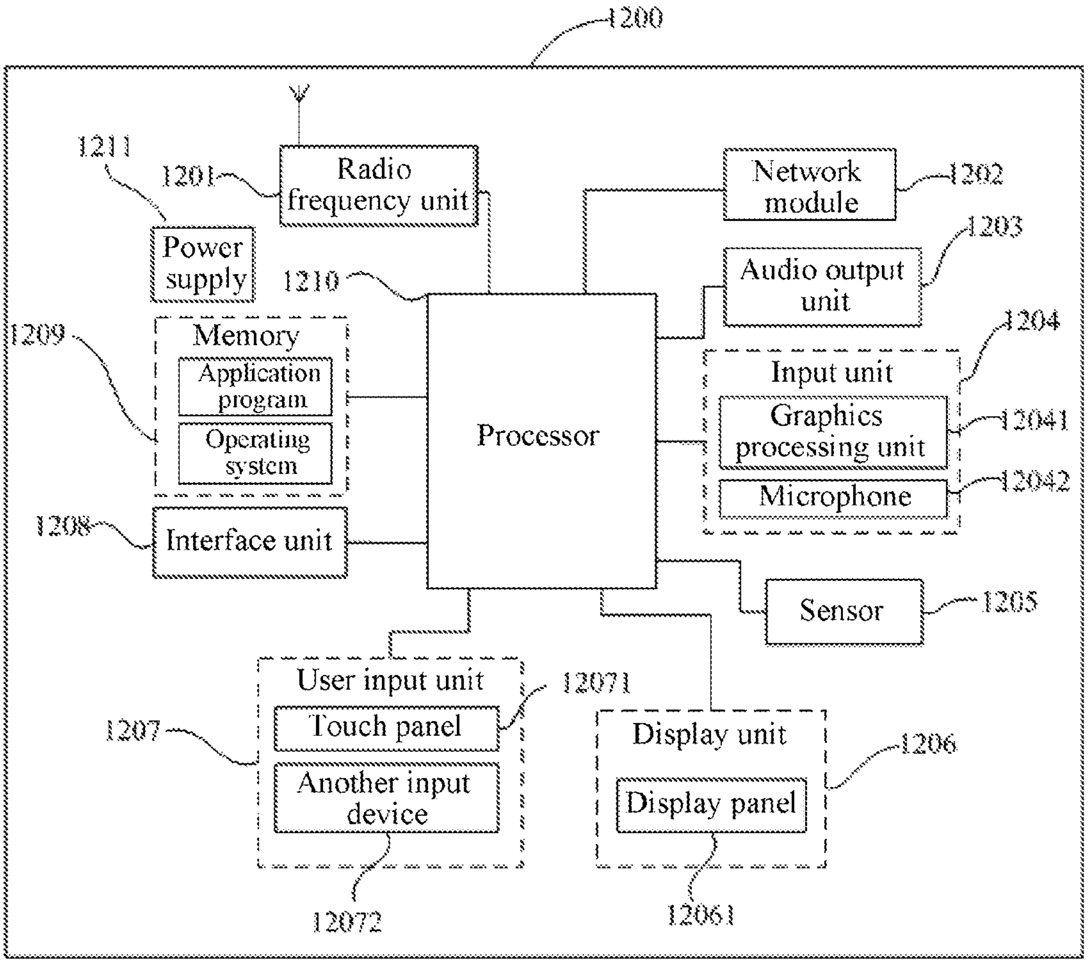
FIG. 8 is a schematic diagram of a hardware structure of an electronic device according to an embodiment of this application.

FIG. 8 is a schematic diagram of a hardware structure of an electronic device for implementing various embodiments of this application.

The electronic device 1200 includes but not limited to: components such as a radio frequency unit 1201, a network module 1202, an audio output unit 1203, an input unit 1204, a sensor 1205, a display unit 1206, a user input unit 1207, an interface unit 1208, a memory 1209, a processor 1210 and a power supply 1211. A person skilled in the art may understand that the structure of the electronic device 1200 shown in FIG. 8 does not limit the electronic device, and the electronic device may include more or fewer components than those shown in the figure, or combine some components, or adopt different component arrangements. In the embodiment of this application, the electronic device includes but not limited to a mobile phone, a tablet computer, a notebook computer, a palm computer, a vehicle-mounted terminal, a wearable device, a pedometer, etc.

The processor 1210 is configured to receive an input of the user input unit 1207, control, when the input is a first input, a deformation driving part 300 to drive a deformable region 221 to be in a flattening state and control a camera module 400 to shoot, and control, when the input is a second input, the deformation driving part 300 to drive the deformable region 221 to be in a bending state.

According to the electronic device disclosed by the embodiment of this application, the structure of the electronic device in the background is improved, such that the display screen 200 includes the first region 210 and the second region 220 which are connected, and the portion of the second region 220 is the deformable region 221. The deformation driving part 300 is connected to the deformable region 221, such that when the electronic device is in the shooting mode, the deformable region 221 can be driven by the deformation driving part 300 to be gradually switched into the flattening state from the bending state, then, the ambient light passes through the light transmitting region 222 and is projected to the camera module 400, and the camera module 400 starts to work. The camera module 400 finishes working, and when the electronic device is in the daily work mode (i.e., the non-shooting mode), the deformable region 221 is driven by the deformation driving part 300 to be gradually recovered to the bending state from the flattening state. The structure can prevent a front surface (i.e., the first region 210), towards a user, of the display screen 200 from being provided with the light transmitting region 222, such that an effective display area of the electronic device can be increased. It is apparent that due to the electronic device disclosed by the embodiment of this application, the display area of the electronic device can be effectively increased, and the display effect of the electronic device is improved.

It is to be understood that in the embodiments of this application, the radio frequency unit 1201 may be configured to receive and transmit a signal in an information receiving and transmitting process or a call process. For example, after downlink data from a base station is received, the downlink data is transmitted to the processor 1210 to be processed; in addition, uplink data is transmitted to the base station. Generally, the radio frequency unit 1201 includes but not limited to an antenna, at least one amplifier, a transceiver, a coupler, a low noise amplifier, a duplexer, etc. In addition, the radio frequency unit 1201 may further communicate with a network and another device through a wireless communication system.

The electronic device provides wireless broadband Internet access for a user by the network module 1202, for example, helps the user to receive and transmit an email, browse a webpage, and access stream media, and the like.

The audio output unit 1203 may convert audio data received by the radio frequency unit 1201 or the network module 1202 or stored in the memory 1209 into an audio signal and output the audio signal as sound. Moreover, the audio output unit 1203 may further provide an audio output (e.g., call signal receiving sound or message receiving sound) related to a specific function executed by the electronic device 1200. The audio output unit 1203 includes a loudspeaker, a buzzer, a receiver, etc.

The input unit 1204 is configured to receive the audio signal or a video signal. The input unit 1204 may include a graphics processing unit (GPU) 12041 and a microphone 12042. The graphics processing unit 12041 processes image data of a static image or a video that is obtained by an image acquisition apparatus (e.g., a camera) in a video acquisition mode or an image acquisition mode. A processed image frame may be displayed on the display unit 1206. The image frame processed by the graphics processing unit 12041 may be stored in the memory 1209 (or another storage medium) or transmitted by the radio frequency unit 1201 or the network module 1202. The microphone 12042 may receive sound and be able to process such sound into audio data. The processed audio data may be converted, in a phone talk mode, into a format that may be transmitted to a mobile communication base station via the radio frequency unit 1201 for output.

The electronic device 1200 further includes at least one sensor 1205, such as an optical sensor, a motion sensor, and other sensors. For example, the optical sensor includes an ambient light sensor and a proximity sensor, where the ambient light sensor may adjust luminance of a display panel 12061 according to brightness of the ambient light, and the proximity sensor may switch off the display panel 12061 and/or backlight when the electronic device 1200 is moved to the ear. As one type of motion sensor, an accelerometer sensor may detect magnitude of accelerations in various directions (generally on three axes), may detect magnitude and direction of gravity when the accelerometer sensor is static, and may be configured to identify the attitude of the electronic device (e.g., screen orientation switching, a related game, and magnetometer attitude calibration), a function related to vibration identification (e.g., a pedometer and a knock), and the like. The sensor 1205 may further include a fingerprint sensor, a pressure sensor, an iris sensor, a molecular sensor, a gyroscope, a barometer, a hygrometer, a thermometer, an infrared sensor, etc., which are not described herein in detail.

The display unit 1206 is configured to display information input by the user or information provided for the user. The display unit 1206 may include a display panel 12061. The display panel 12061 may be configured in the form of a liquid crystal display (LCD), an organic light-emitting diode (OLED), or the like.

The user input unit 1207 may be configured to receive input digit or character information, and generate key signal input related to the user setting and function control of the electronic device. For example, the user input unit 1207 includes a touch panel 12071 and another input device 12072. The touch panel 12071, also called a touchscreen, may collect touch operations by the user on or near the touch panel (e.g., an operation of the user on the touch panel 12071 or near the touch panel 12071 by using a finger or stylus or any suitable object or attachment). The touch panel 12071 may include two parts: a touch detection apparatus and a touch controller. The touch detection apparatus detects a touch orientation of the user, detects a signal brought by the touch operation, and transmits the signal to the touch controller; and the touch controller receives touch information from the touch detection apparatus, converts the touch information into contact coordinates, then transmits the contact coordinates to the processor 1210, and receives and executes a command transmitted by the processor 1210. In addition, the touch panel 12071 may be implemented by using various types, such as a resistive type, a capacitance type, an infrared type, and a surface acoustic wave type. Besides the touch panel 12071, the user input unit 1207 may further include the another input device 12072. The another input device 12072 may include but not limited to a physical keyboard, a functional key (e.g., a volume control key or a switch key), a track ball, a mouse, and a joystick, which are not described herein in detail.

The touch panel 12071 may cover the display panel 12061. After detecting a touch operation on or near the touch panel 12071, the touch panel transmits the touch operation to the processor 1210 to determine a type of a touch event. Then, the processor 1210 provides a corresponding visual output on the display panel 12061 according to the type of the touch event. Although, in FIG. 4, the touch panel 12071 and the display panel 12061 are used as two separate components to implement input and output functions of the electronic device, in some embodiments, the touch panel 12071 and the display panel 12061 may be integrated to implement the input and output functions of the electronic device, which are not specifically limited herein.

The interface unit 1208 is an interface for connecting an external apparatus to the electronic device 1200. For example, the external apparatus may include a wired or wireless headset port, an external power supply (or battery charger) port, a wired or wireless data port, a storage card port, a port configured to connect an apparatus having an identification module, an audio input/output (I/O) port, a video I/O port, an earphone port, and the like. The interface unit 1208 may be configured to receive an input (e.g., data information and electric power) from the external apparatus and transmit the received input to one or more elements of the electronic device 1200 or may be configured to transmit data between the electronic device 1200 and the external apparatus.

The memory 1209 may be configured to store software programs and various types of data. The memory 1209 may mainly include a program storage region and a data storage region. The program storage region may store an operating system, an application program required by at least one function (e.g., a sound play function and an image play function), and the like. The data storage region may store data (e.g., audio data and a phone book) created according to use of the electronic device. In addition, the memory 1209 may include a high-speed random access memory, and may further include a non-volatile memory, such as at least one magnetic disk storage device, a flash memory device, or another volatile solid-state storage device.

The processor 1210 is a control center of the electronic device, and is connected with various parts of the whole electronic device by using various interfaces and lines. By running or executing a software program and/or module stored in the memory 1209, and invoking data stored in the memory 1209, the processor performs various functions and data processing of the electronic device, thereby performing overall monitoring on the electronic device. The processor 1210 may include one or more processing units; and optionally, the processor 1210 may integrate an application processor and a modem processor, where the application processor mainly processes the operating system, a user interface, the application program, and the like, and the modem processor mainly processes wireless communication. It is to be understood that the modem processor may not be integrated into the processor 1210.

The electronic device 1200 may further include a power supply 1211 (e.g., a battery) for supplying power to the components. Optionally, the power supply 1211 may be logically connected to the processor 1210 by a power management system, thereby implementing functions such as charging, discharging, and power consumption management by the power management system.

In addition, the electronic device 1200 includes some functional modules that are not shown, which are not described herein again in detail.

Optionally, an embodiment of this application discloses an electronic device, including a processor 1210, a memory 1209, and a program or instruction stored in the memory 1209 and executable on the processor 1210, and when the program or instruction is executed by the processor 1210, the processes of any above method embodiment are implemented, and the same technical effects are achieved. To avoid repetition, details are not described herein again.

An embodiment of this application discloses a non-transitory readable storage medium, storing a program or instruction. When the program or instruction is executed by a processor 1210, various processes of any above method embodiment are implemented, and the same technical effects are achieved. To avoid repetition, details are not described herein again. The non-transitory readable storage medium may be a read-only memory (ROM), a random access memory (RAM), a magnetic disk, or an optical disc, or the like.

An embodiment of this application discloses a computer program product, stored in a non-volatile storage medium. The program product is configured to be executed by at least one processor to implement the steps of the above control method.

An embodiment of this application discloses a chip, including a processor and a communication interface, the communication interface is coupled to the processor, and the processor is configured to run a program or instruction to implement the control method according to the above embodiment.

It is to be noted that terms "comprise", "include" or any other variation thereof in the specification is intended to cover a non-exclusive inclusion, such that a process, a method, an object or an apparatus including a series of elements not only includes those elements but also includes other elements not clearly listed, or further includes inherent elements for the process, the method, the object or the apparatus. Elements limited by a sentence "including a . . . ", without more limitations, indicate that additional same elements may also exist in the process, the method, the object or the apparatus including the elements. In addition, it is to be noted that the scope of the method and the apparatus in the implementation of this application is not limited to the shown or discussed sequence to execute functions, and involved functions may also be executed basically at the same time or in an opposite sequence. For example, the described method may be executed according to a sequence different from the described sequence, and various steps may also be added, omitted or combined. In addition, features described in some examples may also be referred to be combined in other examples.

According to the descriptions in the foregoing implementations, a person skilled in the art may clearly learn that the method according to the foregoing embodiment may be implemented by software and a necessary general-purpose hardware platform or hardware, and in most cases, the former is a preferred implementation. Based on such an understanding, the technical solutions of this application essentially or the part contributing to the prior art may be embodied in a form of a software product. The computer software product is stored in a storage medium (e.g., a ROM/RAM, a magnetic disk and an optical disc) and includes several instructions for instructing an electronic device (which may be a mobile phone, a computer, a server, an air conditioner, or a network device, or the like) to perform the methods described in the embodiments of this application.

The above embodiments in this application mainly describe differences between the embodiments, different optimized features between the embodiments can be combined into a preferred embodiment as long as there are no contradictions, and considering the brevity, details are not described herein again.

The foregoing descriptions are merely embodiments of this application and are not intended to limit this application. For a person skilled in the art, various modifications and variations can be made to this application. Any modification, equivalent replacement, or improvement, etc. made without departing from the spirit and principle of this application shall fall within the scope of the claims of this application.

What is claimed is:

1. An electronic device, comprising a housing, a display screen, a deformation driving part and a camera module, wherein the display screen is disposed on the housing, a device inner cavity is formed by the display screen and the housing, the camera module and the deformation driving part are both disposed in the device inner cavity;

the display screen comprises a first region and a second region which are connected, a display surface of the first region is a first plane, the second region is located on an edge of the display screen, a portion of the second region is a deformable region;

the deformation driving part is connected to the deformable region, and drives, through deformation, the deformable region to be switched between a flattening state and a bending state; in a case that the deformable region is in the flattening state, a display surface of the deformable region is a second plane, and the second plane and the first plane are located within the same plane; and in a case that the deformable region is in the bending state, the deformable region is a curved surface, a light transmitting region is arranged in the deformable region; and in a case that the deformable region is in the flattening state, ambient light passing through the light transmitting region is projected to the camera module;

wherein the second region further comprises a rigid region, and the rigid region and the deformable region are in a sealing connection through a second elastic connection mechanism.

2. The electronic device according to claim 1, wherein orientation of the light transmitting region intersects with orientation of the camera module, a first reflective member is disposed between the light transmitting region and the camera module, and the ambient light passing through the light transmitting region is reflected to the camera module through the first reflective member.

3. The electronic device according to claim 2, wherein the first reflective member is connected to the deformation driving part, the deformation driving part drives the first reflective member to move to a working position, and the ambient light passing through the light transmitting region is reflected by the first reflective member at the working position to the camera module.

4. The electronic device according to claim 2, wherein the first reflective member is rotationally disposed on an inner side of the deformable region, the electronic device further comprises a driving apparatus, and the driving apparatus is connected to the first reflective member and drives the first reflective member to rotate, such that a light incident surface of the first reflective member faces the deformable region in the flattening state.

5. The electronic device according to claim 2, wherein the first reflective member is rotationally disposed on an inner side of the deformable region, the electronic device further comprises a driving mechanism, and the driving mechanism is disposed on a side of the camera module facing away from the first reflective member, and drives the camera module to push the first reflective member to rotate, such that a light incident surface of the first reflective member is closely attached to the inner side of the deformable region in the flattening state.

6. The electronic device according to claim 5, wherein the first reflective member is a triangular prism, a right-angled portion of the triangular prism is rotationally connected to the deformable region or the deformation driving part; in the flattening state, a first right-angle surface of the triangular prism is arranged towards the deformable region, and a second right-angle surface of the triangular prism is arranged towards the camera module.

7. The electronic device according to claim 5, wherein the first region has an inner surface facing away from the first plane, the inner surface is parallel to the first plane, and the camera module is disposed on the inner surface in a sliding manner.

8. The electronic device according to claim 6, wherein a second reflective member is attached to a bevel edge of the first reflective member, and is a T-lens structural member; the ambient light passing through the light transmitting region sequentially passes through the first reflective member and the second reflective member to be reflected to the camera module; and the second reflective member, in a power-on state, adjusts an angel of the ambient light through thickness adjustment.

9. The electronic device according to claim 1, wherein the electronic device further comprises a first folding mechanism, the first folding mechanism forms a sealing connection between the deformable region and the housing; in a case that the deformable region is in the flattening state, the first folding mechanism is in a first unfolding state; and in a case that the deformable region is in the bending state, the first folding mechanism is in a first folding state.

10. The electronic device according to claim 1, wherein the electronic device further comprises a first elastic connection mechanism, the first elastic connection mechanism forms a sealing connection between the deformable region and the housing; in a case that the deformable region is in the flattening state, the first elastic connection mechanism is in a first stretching state; and in a case that the deformable region is in the bending state, the first elastic connection mechanism is in a first shrinking state.

11. The electronic device according to claim 1, wherein in a case that the deformable region is in the flattening state, the second elastic connection mechanism is in a second stretching state and seals a gap between the deformable region and the rigid region; and in a case that the deformable region is in the bending state, the second elastic connection mechanism is in a second shrinking state and is folded between the deformable region and the rigid region.

12. The electronic device according to claim 1, wherein the housing comprises a rear cover, the rear cover comprises a plane portion and a bending portion that are connected, and in a case that the deformable region is in the bending state, the bending portion is in linkage with the second region, and tangent lines at a joint of the bending portion and the second region are collinear.

13. The electronic device according to claim 1, wherein both the first region and the second region are display regions, and light transmittance of the deformable region is greater than that of the first region.

14. A control method of an electronic device, applicable to the electronic device according to claim 1, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

15. A control method of an electronic device, applicable to the electronic device according to claim 2, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

16. A control method of an electronic device, applicable to the electronic device according to claim 3, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

17. A control method of an electronic device, applicable to the electronic device according to claim 4, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

18. A control method of an electronic device, applicable to the electronic device according to claim 5, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

19. A control method of an electronic device, applicable to the electronic device according to claim 6, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

20. A control method of an electronic device, applicable to the electronic device according to claim 7, the control method comprising:

receiving an input;

controlling, in a case that the input is a first input, the deformation driving part to drive the deformable region to be in the flattening state and controlling the camera module to shoot; and controlling, in a case that the input is a second input, the deformation driving part to drive the deformable region to be in the bending state.

* * * * *